May 25, 1948.  I. R. DOTY  2,441,959
POULTRY AND SMALL LIVESTOCK FEEDER
Filed Nov. 24, 1945  3 Sheets-Sheet 1

Inventor
Irving R. Doty
By Clarence A. O'Brien
and Harvey B. Jacobson
Attorneys

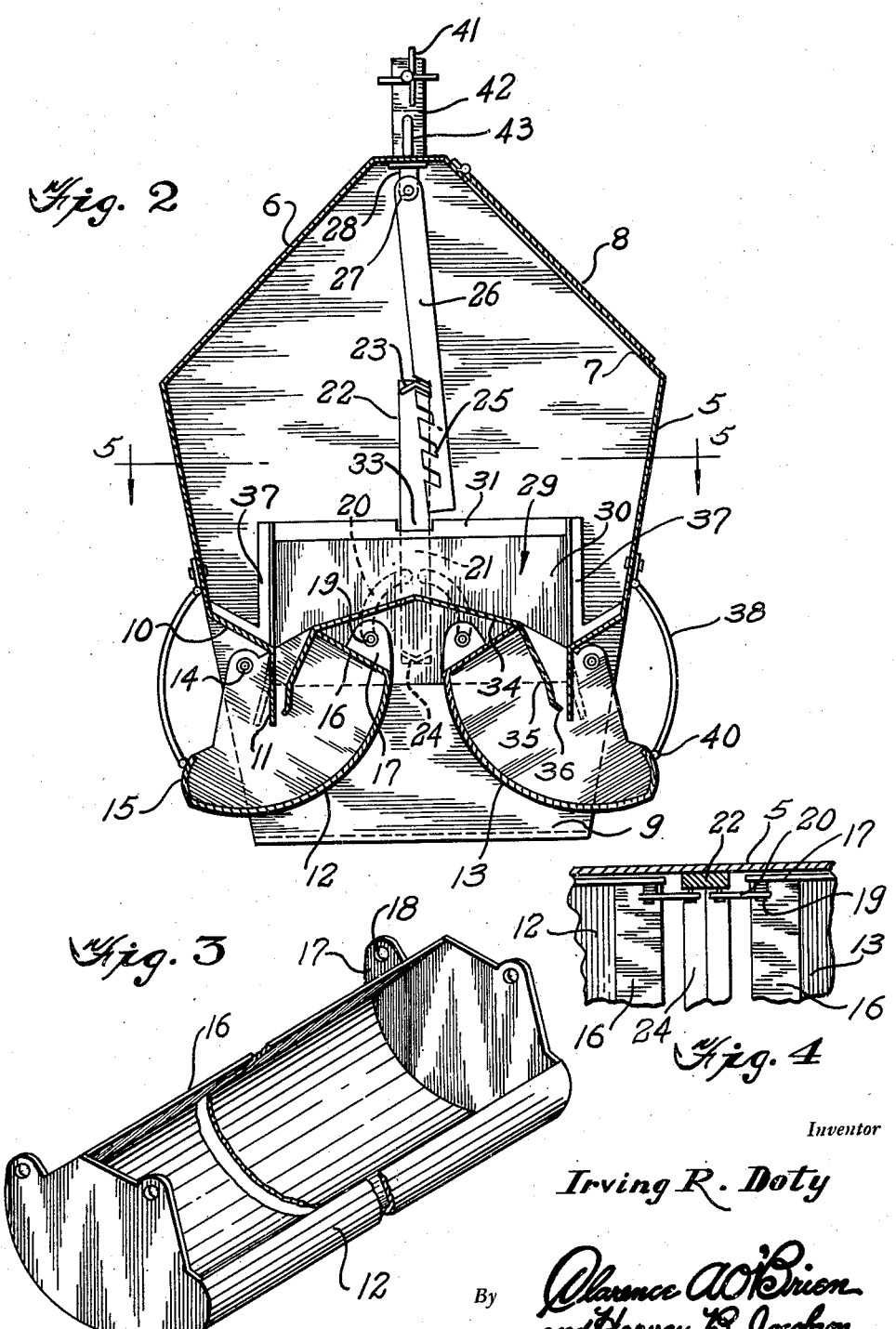

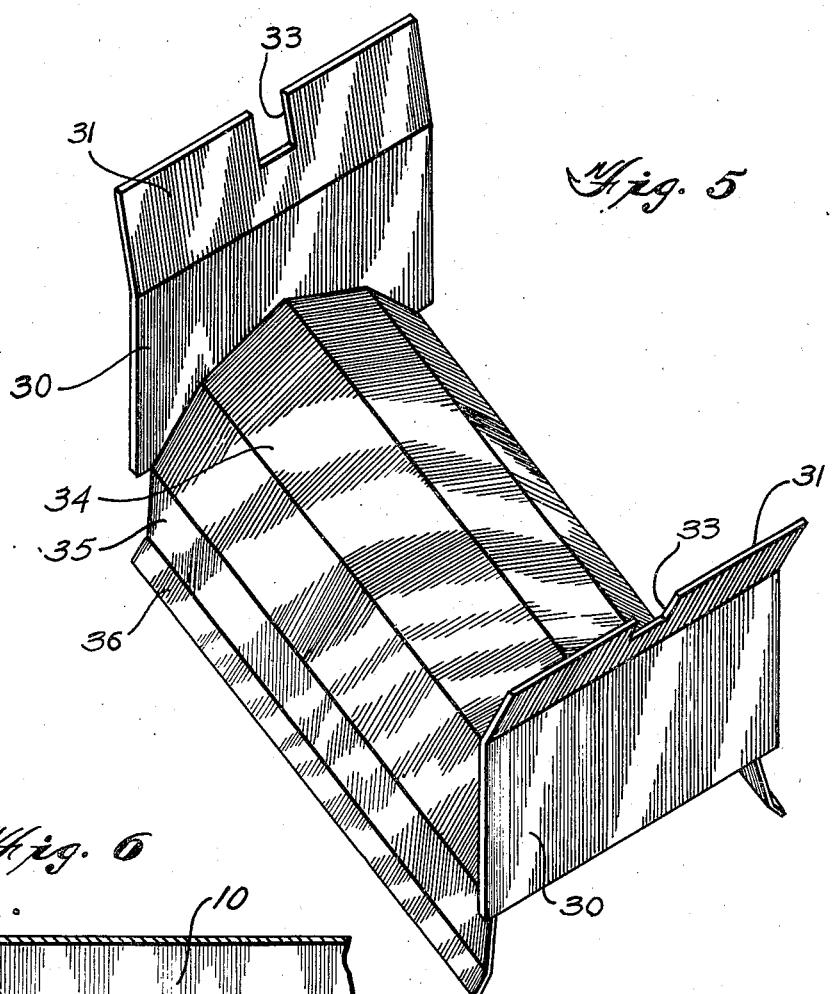
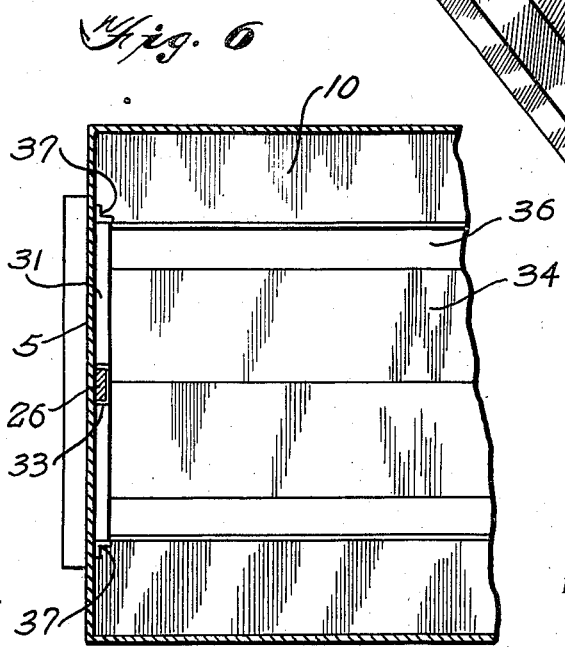

Patented May 25, 1948

2,441,959

UNITED STATES PATENT OFFICE 2,441,959

POULTRY AND SMALL LIVESTOCK FEEDER

Irving R. Doty, Cranford, N. J.

Application November 24, 1945, Serial No. 630,640

6 Claims. (Cl. 119—57)

The present invention relates to new and useful improvements in poultry and small live stock feeding devices adapted for using mash, grain or mixed feed, and aims to generally improve such structures.

An important object of the present invention is to provide a poultry feeder including a hopper for containing the feed and from which the feed is discharged by gravity into a pair of feed troughs at opposite sides of the hopper, the troughs being adjustable vertically in accordance with the size of the poultry feeding from the troughs.

A further object of the invention is to provide means for controlling the quantity of feed discharged into the troughs in accordance with the capacity of the poultry feeding therefrom and including a feed control device supported on the inner edge of the troughs for adjustment in accordance with the vertical adjustment of the troughs.

A further object of the invention is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 2 is a transverse sectional view taken substantially on a line 2—2 of Figure 1.

Figure 3 is a perspective view of one of the feed troughs.

Figure 4 is an enlarged fragmentary sectional view showing the adjusting means for the troughs.

Figure 5 is a perspective view of the feed regulator, and

Figure 6 is a fragmentary transverse sectional view taken substantially on a line 6—6 of Figure 2.

Figure 1:
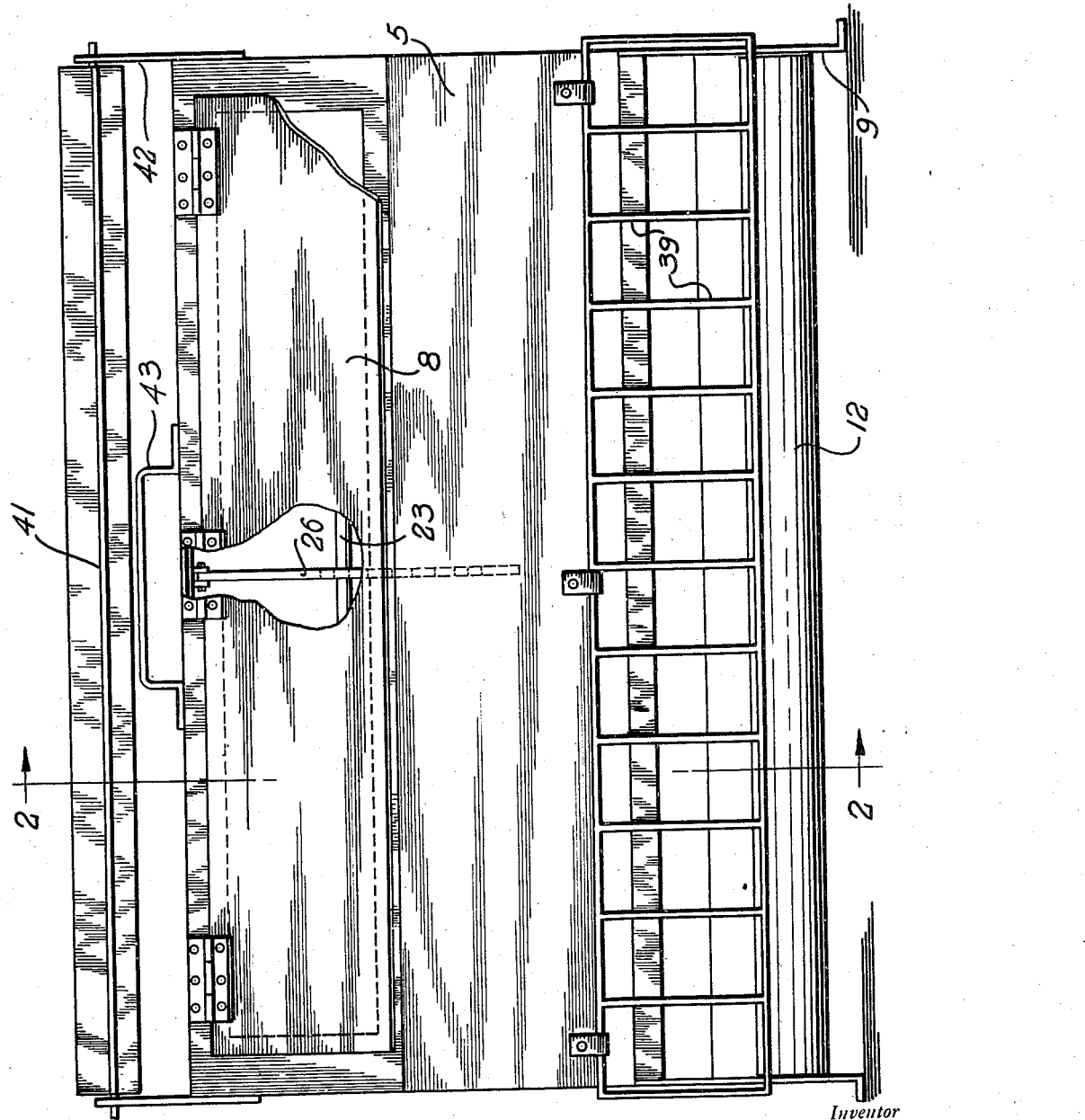
Figure 1 is a side elevational view with parts broken away and shown in section.

Referring now to the drawings in detail wherein for the purpose of illustration I have disclosed a preferred embodiment of the invention, the numeral 5 designates a hopper of elongated construction having sloping upper walls 6 in one of which is formed a filler opening 7 provided with a hinged door 8. The end walls of the hopper are provided with feet 9 for supporting the same in an elevated position above the ground.

The lower portion of the side walls of the hopper are free at their ends from the end walls of the hopper and are inclined inwardly as shown at 10 and terminate in a longitudinally extending skirt portion 11 which extends along each side of the hopper and is disposed substantially perpendicularly.

A pair of troughs 12 and 13 are positioned between the end walls of the hopper below the lower side edges 10 and 11 thereof, the ends of the troughs being pivoted to the lower end walls of the hopper by means of pins 14 and with the skirt portions 11 projecting downwardly into the hoppers substantially at the center thereof.

The front longitudinal edge of each hopper is formed with an inwardly curved lip 15 and the rear edge of each hopper is formed with an upstanding flange 16 which is inclined toward the front edge of the trough.

The end walls of the troughs are formed with tongues 17 projecting rearwardly beyond the rear flange 16, each tongue having an opening 18 therein for pivotally receiving a pin 19 carried at the lower end of an arcuate link 20 which is curved upwardly and inwardly toward the center of the hopper, the links for each of the troughs being pivoted to end members 21 of an upstanding frame 22 which includes upper and lower frame members 23 and 24.

The frame 20 is positioned substantially centrally in the hopper 5 with its end members 21 slidably disposed against the end walls of the hopper, the upper longitudinal frame member 23 being positioned with one edge thereof adapted for selective engagement with inclined notches 25 on one edge of a hanger bar 26 which is pivotally mounted at its upper end to a pin 27 carried by a bracket 28 secured to the inside of the top of the hopper.

A feed regulating member is designated generally at 29 and includes end walls 30 having an outwardly inclined upper edge 31 formed at its center with a notch 33 for slidably receiving the end member 21 of the frame 22. The side edges of the end walls 30 are slidably positioned against the inner sides of the skirts 11, the sides of the regulator 29 being open.

The end walls 30 of the regulator are connected by a bottom structure 34 which slopes downwardly toward each side of the hopper and terminates in an outwardly inclined flange 35 extending along the side edges of the regulator, the flange terminating at its lower edge in an outwardly inclined lip 36 spaced inwardly from the skirted portions 11 of the side walls of the hopper and terminating adjacent the lower edges thereof as will be apparent from an inspection of Figure 2 of the drawings.

The bottom member 34 of the regulator 29 is supported on the upper edge of the flanges 16 of the troughs 12 and 13 at the angle of the flanges 35 and sloping bottom 34 of the regulator.

Accordingly, the regulator 29 is raised and lowered in accordance with the raising and lowering movement of the inner edges of the troughs 12 and 13. To the end walls of the hopper 5 are secured angle iron guides 37 for the upper edges of the end walls 30 of the regulator 29 to guide the regulator perpendicularly during the raising and lowering movement thereof.

To the side walls of the hopper 5, adjacent its lower edge is pivotally attached the upper edge of a reticulated guard 38 which includes outwardly curved spaced apart vertical rods 39 and a lower longitudinal rod 40 which bears against the outside of the lips 15 of the troughs 12 and 13 respectively, the guards swinging upwardly and outwardly during the raising of the troughs.

In the operation of the device the troughs 12 and 13 are swung inwardly and outwardly on the pivot pins 14 to raise or lower the lips 15 on the outer edges of the troughs, the troughs being secured in their vertically adjusted position by means of the notches 25 of the hanger bar 26 engaging an edge of the upper frame member 23 of the frame 22 which is connected to the inner edges of the troughs by the links 20. The hanger bar 26 is accessible through the door 8 of the hopper.

During the vertical adjustment of the inner edges of the troughs the regulator 29 will likewise be raised or lowered to thus regulate the quantity of feed discharged from the hopper into the troughs. The side walls of the hopper may also be bent inwardly or outwardly, as desired to properly space the same from the side edges of the regulator 29 in accordance with the character of feed being used.

Accordingly, when the troughs are moved inwardly to lower the lips 15 thereof for the feeding of small chicks the lip 36 on the lower side edges of the regulator 29 will be moved upwardly substantially closely against the inside of the skirted portions 11 of the hopper to thus permit a relatively small amount of feed to be deposited from the hopper into the troughs. By swinging the troughs 12 and 13 outwardly the regulator 29 will be lowered below the lower edge of the skirted portions 11 of the hopper to permit a larger quantity of feed to be discharged from the hopper into the troughs when poultry of a larger size are feeding therefrom.

A rotating baffle perch 41 of conventional construction is rotatably supported at its ends on upstanding brackets 42 rising from the ends of the hopper to prevent poultry from perching on the top thereof and a handle 43 is also attached to the top of the hopper for conveniently carrying the same from place to place.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed is:

1. A poultry feeder comprising a hopper having an open bottom, a pair of feed troughs pivoted at the sides of the hopper at its lower edges, means connecting the troughs for simultaneous pivotal movement to raise and lower the outer edges of the troughs, and a feed regulator mounted in the bottom of the hopper and operatively connected to the troughs for varying the volume of feed discharged from the hopper into the troughs in accordance with said raising and lowering movement of the troughs.

2. A poultry feeder comprising a hopper having an open bottom, a pair of feed troughs pivoted to the hopper at each side thereof and each having an inner edge projecting under the open bottom to receive feed from the hopper, said inner edges of the troughs being swingable vertically in the hopper, means connecting the troughs to the hopper for securing the inner edges of the troughs in vertically adjusted position, and a feed regulator carried by the troughs and movable vertically therewith to regulate the volume of feed discharged into the troughs.

3. A poultry feeder comprising a hopper having an open bottom and side edges, a pair of feed troughs pivoted to the hopper at each side thereof and each having an inner edge projecting under the open bottom to receive feed from the hopper, said inner edges of the troughs being swingable vertically in the hopper, means connecting the troughs to the hopper for securing the inner edges of the troughs in vertically adjusted position, and a feed regulator carried by the troughs and including side edges movable relative to the side edges of the hopper to regulate the volume of feed discharged into the troughs in accordance with the vertical adjustment of the troughs.

4. A poultry feeder comprising a hopper having an open bottom and side edges, a pair of feed troughs pivoted to the hopper at each side thereof and each having an inner edge projecting under the open bottom to receive feed from the hopper, said inner edges of the troughs being swingable vertically in the hopper, means connecting the troughs to the hopper for securing the inner edges of the troughs in vertically adjusted position, and a feed regulator straddling the inner edges of the troughs for riding thereon and including side edges movable relative to the side edges of the hopper to regulate the volume of feed discharged into the troughs in accordance with the vertical adjustment of the troughs.

5. A poultry feeder comprising a hopper having an open bottom and side edges, a pair of feed troughs pivoted to the hopper at each side thereof and each having an inner edge projecting under the open bottom to receive feed from the hopper, said inner edges of the troughs being swingable vertically in the hopper, means connecting the troughs to the hopper for securing the inner edges of the troughs in vertically adjusted position and including an upstanding member mounted for vertical movement in the hopper, links pivotally connecting said member to the troughs, a retaining member in the hopper securing the upstanding member in vertically adjusted position, and a feed regulator carried by the inner edges of the troughs and movable relative to the side edges of the hopper to regulate the volume of feed discharged into the troughs in accordance with the vertical adjustment of the troughs.

6. A poultry feeder comprising a hopper having an open bottom, a pair of feed troughs pivoted to the hopper at each side thereof and each having an inner edge projecting under the open bottom to receive feed from the hopper, said inner edges of the troughs being swingable vertically in the hopper, means connecting the troughs to the hopper for securing the inner edges of the troughs in vertically adjusted position, and a feed regulator carried by the troughs and including side edges movable relative to the side edges of the hopper to regulate the volume of feed discharged into the troughs in accordance with the vertical adjustment of the troughs, said hopper having its side walls free at the ends of the hopper and adjustable toward or away from the side edges of the regulator.

IRVING R. DOTY.

REFERENCES CITED

The following references are of record in the file of this patent:

UNITED STATES PATENTS

| Number | Name | Date |
|---|---|---|
| 366,933 | Cowan | July 19, 1887 |
| 1,469,677 | Naylor | Oct. 2, 1923 |
| 1,770,754 | Jones | July 15, 1930 |